United States Patent
Saha et al.

(10) Patent No.: US 11,483,254 B2
(45) Date of Patent: Oct. 25, 2022

(54) ALLOCATING VIRTUAL MACHINES IN A GATEWAY COUPLED TO A SOFTWARE-DEFINED SWITCH

(71) Applicant: NOKIA SOLUTIONS AND NETWORKS OY, Espoo (FI)

(72) Inventors: Sumanta Saha, Espoo (FI); Tommy Johannes Lindgren, Espoo (FI); Jani Olavi Soderlund, Vantaa (FI); Niko Markus Savolainen, Kerava (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 828 days.

(21) Appl. No.: 15/110,326

(22) PCT Filed: Jan. 9, 2014

(86) PCT No.: PCT/EP2014/050252
§ 371 (c)(1),
(2) Date: Jul. 7, 2016

(87) PCT Pub. No.: WO2015/104053
PCT Pub. Date: Jul. 16, 2015

(65) Prior Publication Data
US 2016/0330136 A1    Nov. 10, 2016

(51) Int. Cl.
*H04L 47/70*    (2022.01)
*H04L 41/0663*    (2022.01)
(Continued)

(52) U.S. Cl.
CPC ............ *H04L 47/82* (2013.01); *G06F 9/5072* (2013.01); *G06F 11/1484* (2013.01);
(Continued)

(58) Field of Classification Search
USPC .................................................. 709/220–226
See application file for complete search history.

(56) References Cited

U.S. PATENT DOCUMENTS

| | | | |
|---|---|---|---|
| 2010/0088698 A1* | 4/2010 | Krishnamurthy | H04L 63/10 718/1 |
| 2010/0131636 A1* | 5/2010 | Suri | H04L 45/22 709/224 |

(Continued)

FOREIGN PATENT DOCUMENTS

| | | |
|---|---|---|
| CN | 102771095 A | 11/2012 |
| CN | 102884763 A | 1/2013 |
| CN | 103368768 A | 10/2013 |
| EP | 2 648 391 A1 | 10/2013 |

OTHER PUBLICATIONS

International Search Report and Written Opinion dated May 22, 2014, corresponding to International Patent Application No. PCT/EP2014/050252.

(Continued)

*Primary Examiner* — Younes Naji
(74) *Attorney, Agent, or Firm* — Squire Patton Boggs (US) LLP

(57) ABSTRACT

There is provided allocating cloud computing resources to process a user session by a gateway in a mobile communications network, and allocating the cloud computing resources in pairs to user sessions. Rules for the pair of allocated resources are determined such that incoming control plane traffic associated with the session is forwarded to the both cloud computing resources forming the pair.

14 Claims, 3 Drawing Sheets

(51) Int. Cl.
  *H04L 69/40* (2022.01)
  *G06F 11/14* (2006.01)
  *H04L 41/50* (2022.01)
  *G06F 9/50* (2006.01)
  *H04L 12/46* (2006.01)
  *H04L 41/0668* (2022.01)

(52) U.S. Cl.
  CPC ...... *H04L 41/0663* (2013.01); *H04L 41/5096* (2013.01); *H04L 69/40* (2013.01); *H04L 12/4633* (2013.01); *H04L 41/0668* (2013.01)

(56) References Cited

U.S. PATENT DOCUMENTS

| | | | |
|---|---|---|---|
| 2011/0075571 A1* | 3/2011 | Hao | H04W 8/12 370/245 |
| 2012/0023153 A1* | 1/2012 | Karasaridis | H04L 67/52 709/203 |
| 2012/0198441 A1* | 8/2012 | Mahdavi | H04L 12/6418 718/1 |
| 2012/0300615 A1* | 11/2012 | Kempf | H04W 24/02 370/216 |
| 2013/0091376 A1* | 4/2013 | Raspudic | G06F 11/1484 714/E11.03 |
| 2013/0246838 A1 | 9/2013 | Reddy | |
| 2013/0254762 A1* | 9/2013 | Cochran | G06F 9/45558 718/1 |
| 2014/0006843 A1 | 1/2014 | Kim et al. | |
| 2015/0103746 A1* | 4/2015 | Matsushima | H04L 69/22 370/328 |
| 2015/0131997 A1* | 5/2015 | Syed | H04J 14/0256 398/69 |
| 2015/0139238 A1* | 5/2015 | Pourzandi | H04L 45/42 370/392 |
| 2015/0154046 A1* | 6/2015 | Farkas | G06F 9/45558 718/1 |

OTHER PUBLICATIONS

3GPP TS 23.401 V12.2.0 (Sep. 2013); 3rd Generation Partnership Project; Technical Specification Group Services and System Aspects; General Packet Radio Service (GPRS) enhancements for Evolved Universal Terrestrial Radio Access Network (E-UTRAN) access (Release 12).
3GPP TS 23.402 V12.2 0 (Sep. 2013); 3rd Generation Partnership Project; Technical Specification Group Services and System Aspects; Architecture enhancements for non-3GPP accesses (Release 12).
RFC 2281; T. Li, et al.; "Cisco Hot Standby Router Protocol (HSRP)"; Network Working Group; Mar. 1998; 17 pages.
RFC 2338; S. Knight, et al.; "Virtual Router Redundancy Protocol"; Network Working Group; Apr. 1998; 27 pages.
Chinese Office Action application No. 201480072389.9 dated Oct. 24, 2018.
Communication pursuant to Article 94(3) EPC dated Aug. 23, 2018 corresponding to European Patent Application No. 14 700 174.7.
Yu Wu et al., "vSkyConf: Cloud-assisted Multi-party Mobile Video Conferencing," Mobile Cloud Computing, ACM, Aug. 16, 2013, pp. 33-38, XP058030758.
Chinese Office Action corresponding to Appln. No. 201480072389. 9, dated Jul. 3, 2019.
Chinese Office Action corresponding to CN Appln. No. 201480072389. 9, dated Jan. 9, 2020.

* cited by examiner

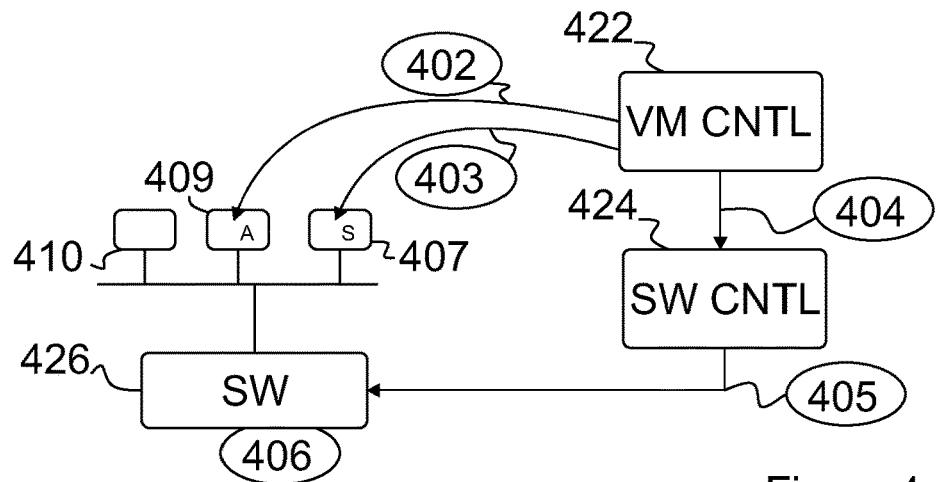
Figure 4a
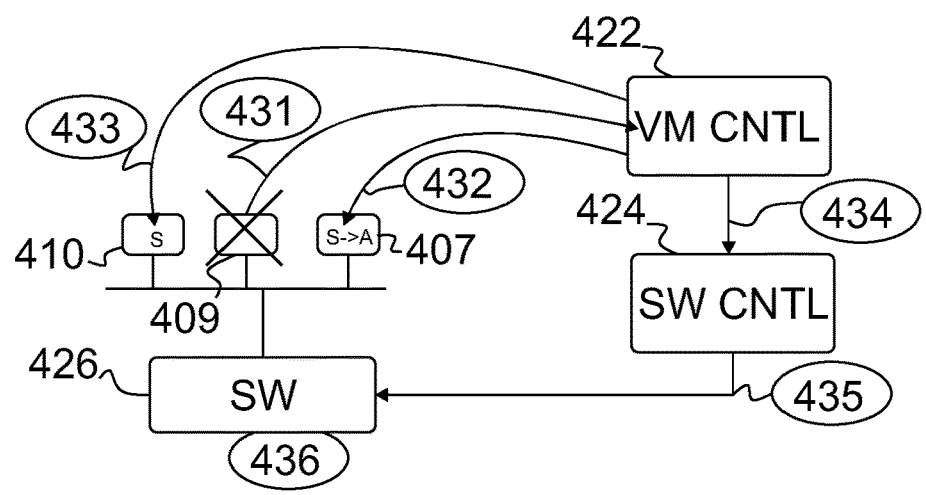
Figure 4b
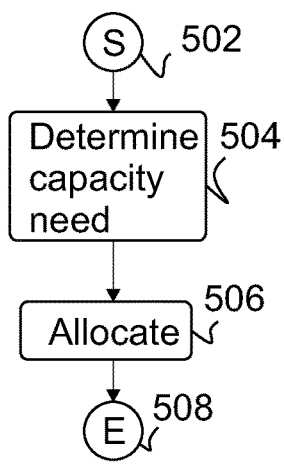 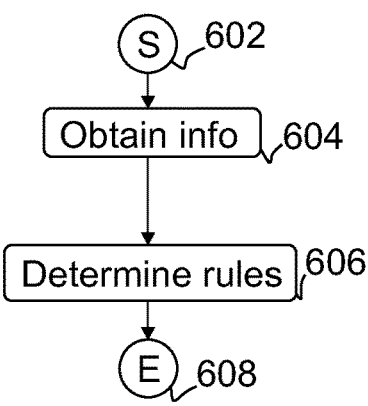 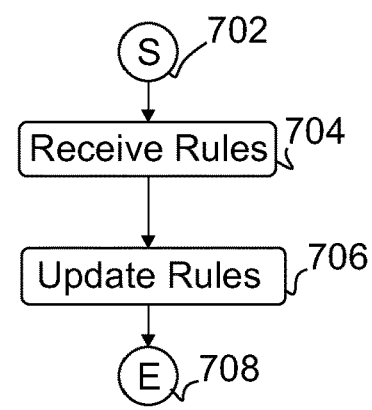
Figure 5  Figure 6  Figure 7

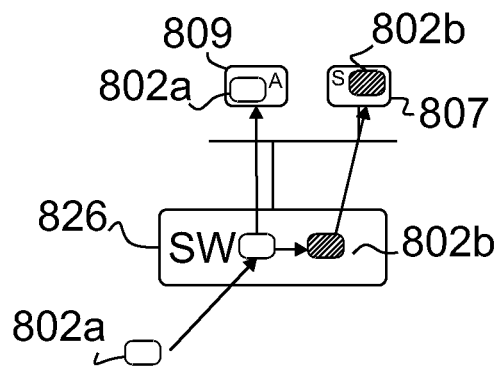
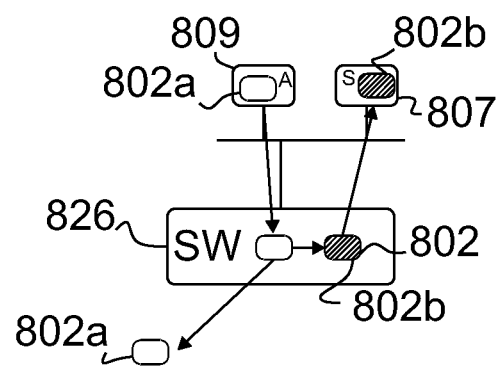
Figure 8a                                    Figure 8b
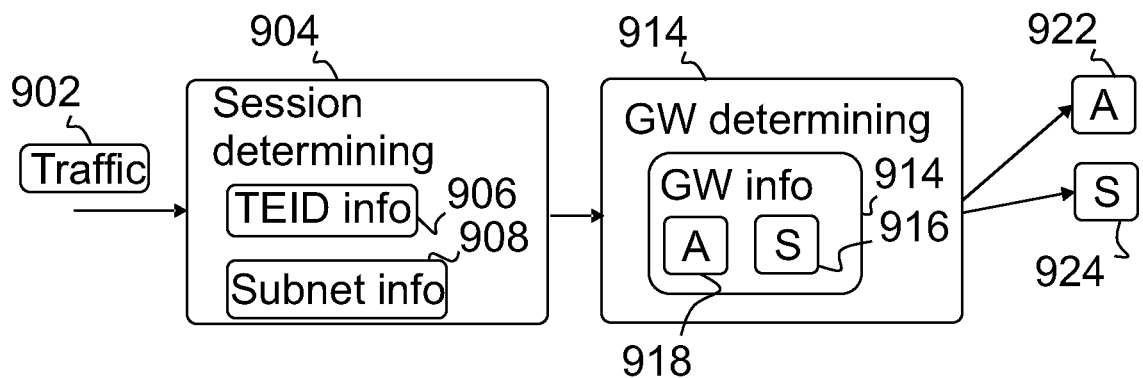
Figure 9

ALLOCATING VIRTUAL MACHINES IN A GATEWAY COUPLED TO A SOFTWARE-DEFINED SWITCH

FIELD

The invention relates to a gateway in a mobile communications network and more particularly to allocating cloud computing resources to process a user session by the gateway.

BACKGROUND

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

In a mobile network, the user sessions are established as tunnels between the Mobile Terminals (MT) and Gateways (GW). Due to cellular network architecture, Gateways are the aggregation points for the user sessions, providing the anchor towards the services in the Internet or operator service network. In $3^{rd}$ Generation (3G) mobile communications networks the gateway is the Gateway GPRS Support Node (GGSN) element, and in Long Term Evolution (LTE) networks the System Architecture Evolution-Gateway (SAE-GW) element.

The number of Gateway elements in an operator network ranges from the minimum two (2) to up to twenty (20), depending on the size of the operator's subscriber base, redundancy requirements, site strategy, element capacity, and so forth. However, with the increasing number of gateway elements the user sessions are distributed across the gateway elements and visibility of the traffic through the gateway elements is decreased or at least becomes more difficult to establish.

Telecom products such as the gateway elements have a very strict requirement of redundancy. The operators expect almost zero downtime from the products, which is usually met by the vendors using hot standby nodes that are always in sync with active nodes serving the network. This active-standby architecture means that there is a stringent requirement for active-standby synchronization of states to make sure that in case of active node failure, the standby node can immediately start serving from the same state as the failed active node. Gateway elements usually have a session database which contains most of the necessary session/bearer specific states and controls the subscriber sessions in the system. The session database is one of the most important databases of the system as it determines the connectivity of the subscriber to the network.

The process responsible for maintaining the session bearers (PDP contexts in 3G terminology) usually does so with the help of an in-memory database to keep the state of each bearer. In said database, various important state indicating fields of the bearer is stored, such as, the identifying Tunnel Endpoint Identifier (TEID), possibly the mobile Internet Protocol (IP) address, activity timers, current status of the bearer, etc. To align with the stringent requirement of fault tolerance for telecom products, the packet gateway products usually resort to a hot active-standby mode where the standby node is always kept in sync with the active node so that it can take over immediately in case of any fault in the active node.

Preferably, the state of the active node and the standby node are at least almost identical to make sure that the switchover is as smooth as possible without any disruption of services. This may be achieved by a synchronisation operation between the active node and the standby node whenever any state of a particular bearer changes. For example, if a product supports 3 million active bearers and at a point of time approximately half of them changes state, it will mean 1.5 million synchronization messages between the active and standby instances.

Typically the current LTE SAE-GWs are built as standalone network elements using dedicated hardware. However, dedicated hardware has poor scalability and interoperability between hardware from different proprietors may be poor.

BRIEF DESCRIPTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

An object of the present invention is to provide a method and an apparatus for implementing the method so as to alleviate at least part of the above problems. The objects of the invention are achieved by a method, an apparatus, a gateway and a computer program which are characterised by what is stated in the independent claims. The preferred embodiments of the invention are disclosed in the dependent claims.

According to an aspect there is provided a method comprising allow cating cloud computing resources to process a user session by a gateway in a mobile communications network, and allocating the cloud computing resources in pairs to user sessions. When cloud computing resources are allocated in pairs to user sessions, a user session is defined two cloud computing resources for processing traffic of the user session.

According to an aspect there is provided a method comprising obtaining information on a pair of cloud computing resources allocated to a user session by a gateway in a mobile communications network, determining rules for the pair such that incoming control plane traffic associated with the session is forwarded to the both cloud computing resources forming the pair.

According to an aspect there is provided a method comprising maintaining information on user sessions processed by a gateway in a mobile communications network, wherein the gateway is implemented by cloud computing resources, maintaining an allocation of cloud computing resources for processing a user plane traffic of the user session and for processing control plane traffic of the user session.

According to an aspect there is provided an apparatus comprising means to perform a method according to a method according to an aspect.

A gateway for a mobile communications network, said gateway comprising user plane traffic processors implemented by cloud computing resources allocated in pairs to user sessions, and user plane traffic is processed by an active cloud computing resource for a session and control plane traffic is forwarded to both cloud computing resources of the pair of cloud computing resources associated with the session. When cloud computing resources are allocated in pairs to user sessions, a user session is defined two cloud computing resources for processing traffic of the user session.

A computer program product comprising executable code that when executed, cause execution of functions of a method according to an aspect.

According to an aspect there is provided a computer program embodied on a non-transitory computer readable storage medium, the computer program being configured to control a processor to perform a method according to an embodiment.

According to an aspect there is provided a computer program embodied on a distribution medium, comprising program instructions which, when loaded into an electronic apparatus, constitute the functionality of the apparatus.

Some aspects provide improvements comprise scalability of the packet data gateway to different traffic situations, while enabling high-availability of provided telecommunications services in failure situations.

BRIEF DESCRIPTION OF THE DRAWINGS

In the following the invention will be described in greater detail by means of preferred embodiments with reference to the accompanying drawings, in which

FIG. 4a illustrates allocating a pair of cloud computing resources to a user session according to an embodiment;

FIG. 4b illustrates allocating a new pair of cloud computing resources to a user session upon a failure of one cloud computing resources from a pair allocated to the user session;

FIG. 5 illustrates a method of controlling cloud computing resources according to an embodiment;

FIG. 6 illustrates a method of controlling a software defined switch;

FIG. 7 illustrates a method of mapping user plane traffic of user session to a cloud computing resource;

FIGS. 8a and 8b illustrate control plane replication in a software defined switch according to an embodiment; and FIG. 9 illustrates an example configuration of a software defined switch according to an embodiment.

DETAILED DESCRIPTION

Figure 1:
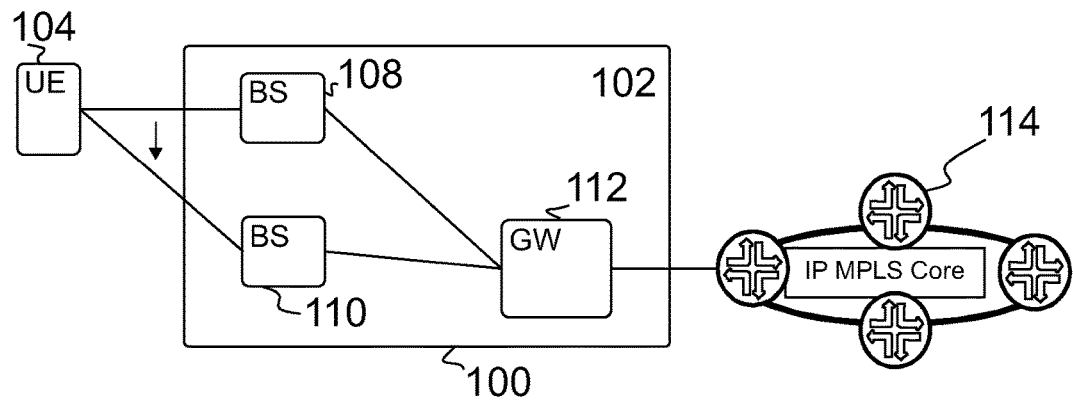
FIG. 1 illustrates an architecture of a mobile communications system according to various embodiments.

FIG. 1 illustrates an architecture of a mobile communications system 100 according to various embodiments. The mobile communications system comprises base stations 108, 110 that may be connected by User Equipment (UE), when the UE 104 is within the base station's coverage area. The UE may move between the coverage areas of the BSs. The movement of the UE may cause a handover of the connection of the UE from one BS to another. In FIG. 1 the handover is illustrated by the arrow from BS 108 to BS 110.

The mobile communications network provides services to its subscribers. These services comprise data transfer, voice call, Voice over IP, short message services, to name a few. The UE holding a subscription to the mobile communications network may access the services via the BSs that connect the UE to the mobile communications network. When the UE is connected to the mobile to the mobile communications network, the services of the mobile communications network may be delivered to the UE.

The services of the mobile communications network may be delivered to the UE by establishing a session to the UE for delivering the service. This session may be referred to a user session. A session may include a definition of the service, definition of the service quality and information of resources allocated to the session. The resources of the mobile communications network may comprise one or more bearers, for example.

A Gateway (GW) in the mobile communications network may manage establishment, termination and mobility of the sessions. The GW may connect the UE to external networks 114 such that data destined to the UE arrives in the mobile communications network at the GW and data originating from the UE is routed towards its destination located in the mobile communications network or in an external network 114 by the GW. Accordingly, the GW provides data transfer service to the UE.

In EPC, the GW may be implemented by Packet Data Network Gateway (P-GW) and Serving Gateway (S-GW) in separate or a single element. The P-GW and S-GW may be implemented as separate elements. For a single session the S-GW and the P-GW may be located in different networks. When the UE is roaming outside its home network, the S-GW serving the UE is located in the network the UE is visiting and the P-GW is located in the home network as a mobility anchor of the UE. The following 3GPP specifications may be referred to for specifications of the EPC: TS 23.401 V12.2.0 (2013-09) General Packet Radio Service (GPRS) enhancements for Evolved Universal Terrestrial Radio Access Network (E-UTRAN) access, and TS.23.402 V12.2.0 (2013-09) 3GPP System Architecture Evolution.

Figure 2:
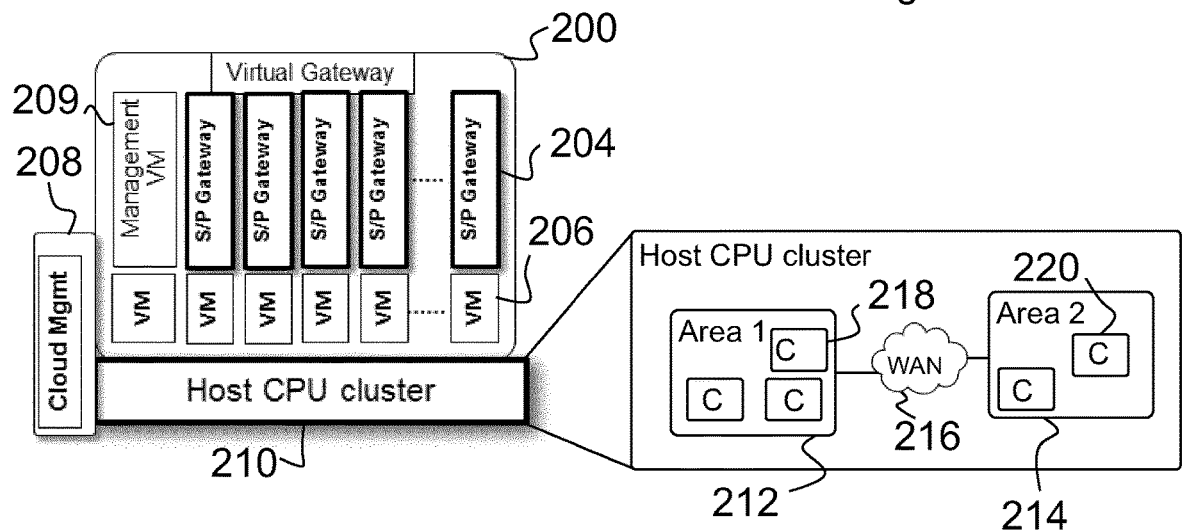
FIG. 2 illustrates a packet data gateway comprising cloud computing resources for processing user sessions anchored to the packet data gateway according to an embodiment.

FIG. 2 illustrates an architecture of a gateway 200 comprising cloud computing resources 206 for processing user sessions according to an embodiment. The cloud computing resources are networked resources for computing data. A single cloud computing resource may comprise networked 216 physical data computing resources 210, e.g. one or more computers 218, 220 and/or central processing units that are connected via a network 216 to a cloud controller 208. The cloud controller defines cloud computing resources from the physical resources. The defined cloud computing resources may be allocated for data computing tasks over a network similar to directly referenced physical resources, whereby the cloud computing resources may be referred to as Virtual Machines (VMs).

The VMs may be configured to execute a GW functionality 204 and VM controller 209 functionality. The VM controller controls the allocation of VMs defined by the cloud controller for computing tasks within the gateway. The VM controller may also perform failure management of the VMs.

The physical computing resources in a cloud may be located in separate geographical areas 212, 214. Although, the physical resources may be connected via a wide area network, their co-operation in executing a GW functionality could involve long delays that could even be unacceptable high considering requirements posed by standards and the operator of the mobile communications network. Therefore, when the GW functionality is executed using a VM, it is preferable to define the cloud computing resources in the cloud controller for allocation to the VMs such that the physical resources mapped to a single VM are connected by a high-speed connection, e.g. the physical resources are connected by a direct connection over a data bus. On the other hand, since the actual physical resources of the VMs may be in geographically separate areas 212, 214, data transfers between the VMs should be kept low to avoid delays due to communications between the VMs. The GW functionality and the VM functionality may be defined by programs.

Figure 3:
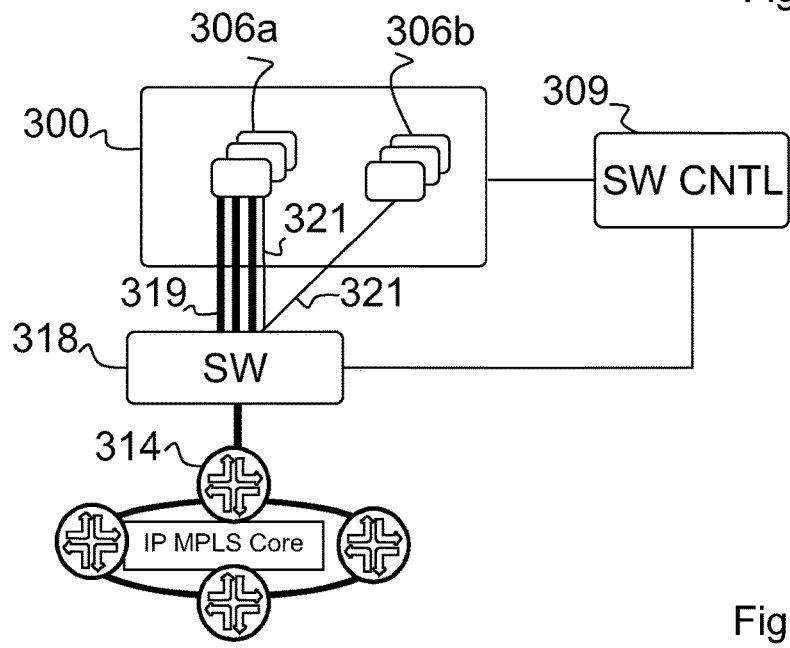
FIG. 3 illustrates a packet data gateway comprising cloud computing resources allocated in pairs to user sessions and paths of control plane traffic and user plane traffic between a software defined switch and the cloud computing resources.

FIG. 3 illustrates a gateway 300 comprising cloud computing resources 306a, 306b and paths of control plane traffic 321 and user plane traffic 319 between a software defined switch 318 and the cloud computing resources 306a, 306b. FIG. 2 illustrates an example architecture for implementing the gateway 300. The allocated cloud computing resources may be referred to as VMs.

The software defined switch may be programmed to perform switching of traffic from UE subscribed to a mobile communications network 314 and/or traffic destined to UE connected to the mobile communications network 314. The switch may be connected to the gateway in the mobile communications network of FIG. 1.

Preferably the VMs comprise an active VM and an inactive VM for each user session. The inactive VM may be a standby VM that may be switched active, when needed. The active VM may receive user plane traffic and control plane traffic of the user session and process the received user plane traffic and control plane traffic according to the GW software executed on the VM. The inactive VM may receive control plane traffic and process the received control plane traffic according to the GW software. Accordingly, the active VM takes care of processing the user plane traffic and the inactive VM does not need to use resources in processing the user plane traffic. On the other hand the control plane traffic is received by both VMs, whereby the both VMs stay updated regarding the state of the user session.

In an embodiment, the switch may be configured to receiving control plane traffic of a user session, and forwarding the received control plane traffic to both cloud computing resources from a pair of cloud computing resources allocated to the user session. This provides control plane replication that is described in more detail in FIGS. 8a and 8b below.

In an embodiment, the switch may be configured to receiving user plane traffic of a user session, and forwarding the received user plane traffic to an active cloud computing resource from a pair of cloud computing resources allocated to the user session.

The GW may connect to a controller 309, SW CNTL, of the software defined switch 309, SW, for communicating information indicating VMs allocated to user sessions. The allocation will be discussed in more detail with FIG. 4a. The SW CNTL may then determine rules on the basis of the obtained information such that incoming control plane traffic belonging to the user session is forwarded to the both VMS forming the pair. The rules are communicated to the software defined switch and deployed after which the user session may be processed according to the rules in the switch.

Connections between the gateway, software defined switch and the SW CNTL may be implemented for example by electrical connections that me comprise Ethernet connections, also optical connections are possible to use.

FIG. 4a illustrates allocating a pair 407, 409 of cloud computing resources 407, 409, 410 to a user session according to an embodiment. The cloud computing resources 407, 409, 410 may be VMs in the GW illustrated in FIG. 2 and FIG. 3. Traffic may be switched for processing by the VMs by a software defined switch 426 under programming by a SW CNTL 424, as described in FIG. 3. The VMs may be managed by a VM controller (VM CNTL) 422 that may be implemented by the VM management item 209 in FIG. 2.

VMs may be allocated 402, 403 to user sessions in pairs under control of the VM CNTL 422. The allocation may be performed on the basis of determining a need for more capacity. The need may be determined for example by obtaining a request to establish a user session in the GW. This request may be received from the UE or an entity in the mobile communications network that manages the services provided to subscribers. In the EPV, this request may be received from the Mobility Management entity, MME.

Preferably one of the VMs are allocated 402 as an active VM 409 for the user sessions and one of the VMs is allocated 403 as an inactive 407 VM for the user session.

Information indicating allocated VMs to the user session may be communicated 404 from the VM CNTL to the SW CNTL. The communications between the VM CNTL and SW CNTL may be performed according to a control protocol, for example OpenFlow.

The SW CNTL may determine rules for the allocated pair of VMs such that incoming control plane traffic belonging to the session is forwarded to the both cloud computing resources forming the pair.

A software defined switch obtains 405 the determined rules that include information of at least one VM allocated to the user session for processing user plane traffic of the user session. OpenFlow may also be used in communications between the software defined switch and the SW CNTL.

The software defined switch may update 406 current rules for switching traffic belonging to the user session towards the VMs allocated to the user session. After the rules are updated the user plane traffic of the user session may forwarded to the active VM for processing and the control plane traffic of the user session is forwarded to the both the active and inactive VMs for processing. It should be appreciated that if the user session does not have prior rules for switching in the software defined switch, the rules received from the SW CNTL define directly the rules for switching and no updating is needed.

FIG. 4b illustrates allocating a new pair 407, 410 of cloud computing resources 407, 409, 410 to a user session upon a failure of one cloud computing resource 409 from a pair allocated to the user session. The allocation of the new pair may be followed by the allocation of the VMs illustrated in FIG. 4a. Accordingly, the VM CNTL, SW CNTL and the VMs correspond to the ones described in FIG. 4a.

The VM CNTL 422 may determine 431 a failure of one of the VMs from the pair and allocate a new VM 410 to the pair.

The VMs allocated to the session may comprise an active VM and an inactive VM that is a standby for the active VM. Depending on whether the failed VM is the active or inactive in the pair, the operation of the VM CNTL may be different in allocating the VMS to the user session.

Accordingly, when the failed cloud computing resources comprise the standby cloud computing resource, the failed cloud computing may be replaced by the new cloud computing resource. In this way the processing of the user plane traffic by the active VM may remain unaffected by the failure and replacement of the failed VM.

On the other hand, and according to the illustration of FIG. 3, when the failed VM comprises the active VM 409, the standby VM 407 is set 423 as active, and the new VM 410 is allocated 433 as a standby for the user session.

The allocated VMs to the user session may be communicated 434 to the SW CNTL 424 similar to item 404.

The SW CNTL may obtain 434 information on the new allocation of at least one VM to the user session for processing user plane traffic of the user session. The SW CNTL may update 436 a current allocation between a user session and a cloud computing resource allocated to the user session, on the basis of the obtained new allocation. The new allocation of the VMs may be used to determined new rules for the allocated pair of VMs such that incoming control plane traffic belonging to the session is forwarded to the both cloud computing resources forming the pair. The new rules may be communicated 435 to the SW and updated 436 in the SW similar to described above in steps 405 and 406 in FIG. 4a.

FIG. 5 illustrates a method of controlling cloud computing resources according to an embodiment. The method may be performed 502 by the VM CNTL illustrated in FIGS. 4a and 4b, when the VM CNTL has access to defined cloud computing resources. The method comprises allocating 504 cloud computing resources to process a user session by a gateway in a mobile communications network and allocating 506 the cloud computing resources in pairs to user sessions. The method ends 508 after the cloud computing resources have been allocated.

FIG. 6 illustrates a method of controlling a software defined switch. The method may be performed 602 by the SW CNTL illustrated in FIGS. 4a and 4b, when the SW CNTL is connected to VM CNTL for allocated cloud computing resources and software defined switches. The method comprises obtaining 604 information on a pair of cloud computing resources allocated to a user session by a gateway in a mobile communications network, determining 606 rules for the pair such that incoming control plane traffic belonging to the session is forwarded to the both cloud computing resources forming the pair. The method may stop 608, when the rules have been determined for controlling the switch, and the rules may be communicated to the switch.

FIG. 7 illustrates a method of switching traffic of a user session in a mobile communications network for processing by cloud computing resources allocated to the user session. The method may start 702 after the rules for switching have been obtained and deployed. The method comprises maintaining 704 information on user sessions processed by a gateway in a mobile communications network, wherein the gateway is implemented by cloud computing resources, and maintaining 706 an allocation of cloud computing resources for processing a user plane traffic of the user session and for processing control plane traffic of the user session. The allocation of cloud computing resources is maintained for the sessions and the method may stop 708.

The maintaining of the information on user sessions and allocation of the cloud computing resources may be provided by obtaining and updating rules from the SW CNTL as described in 405, 435 and 405, 435 in FIGS. 4a and 4b. The rules may comprise a mapping of received traffic to a pair of VMs FIGS. 8a and 8b illustrate control plane replication in a software defined switch 826 according to an embodiment. The software defined switch may connected to switch traffic originating and/or destined to a gateway of a mobile communications network as described in any of the above embodiments and examples. The gateway may include VMs 809, 807 to process traffic received in the gateway, as described e.g. in FIG. 2. The VMs may be allocated to process traffic belonging to a user session in pairs in which one of the VMs is active 809 and the other 807 is a standby VM.

In FIGS. 8a and 8b the traffic comprises control plane traffic. The control plane traffic may comprise one or more messages according to a control plane protocol, e.g. the GPRS Tunneling Protocol control, GTP-c.

FIG. 8a illustrates replication of control plane traffic received from a mobile communications network or an external network. The traffic may belong to a user session in a mobile communications network, whereby the switch directs the received traffic for processing by the VMs 809, 807 implementing the functionality of the gateway. The replication may comprise forwarding the received control plane traffic to both VMs in the pair of VMs allocated to process traffic belonging to the user session. The replication may be performed by generating a copy 802b of the received traffic and sending the received traffic to the active VM and the generated copy to the standby VM. In FIG. 8a and FIG. 8b the copy is illustrated by a hatched filling of the object.

FIG. 8b illustrates replication of control plane traffic received from the active VM. A copy of the traffic received from the active VM may be generated. The received traffic 802a may be sent towards its destination in the mobile communications network or an external network, and the copy 802b may be sent to the standby VM.

The replication illustrated in FIGS. 8a and 8b provides keeping the standby VM updated, whereby upon failure of the active VM, the processing may be continued by changing the standby VM to active VM. Since the standby VM is updated by the control plane traffic by the switch, traffic between the VMs may be kept low.

FIG. 9 illustrates an example configuration of a software defined switch according to an embodiment. The configuration is illustrated by functional blocks for processing traffic 902 received by the switch. The traffic may comprise control plane traffic and/or user plane traffic. The functional blocks may be implemented by the software defined switch in FIG. 4a after receiving rules for switching from the SW CNTL. The traffic may comprise user plane and/or control plane traffic.

In 904, a user session associated with the received traffic may be determined. The traffic may comprise one or more packets that may include information identifying the packets to belong to a specific user session or a group of sessions. The information may comprise information from more than protocols in a protocol stack used for communications. The protocols may comprise a network layer protocol, e.g. the IP, that provides connectivity between hosts across a network, and a tunnelling protocol, that encapsulates network layer protocol data units into tunnelling protocol data units that include tunnel identities. The tunnelling protocol may be the GTP-user data tunnelling, GTP-u. GTP-u messages include Tunnel Endpoint Identifiers, TEIDs, that may be used to identify a specific tunnel. Thereby a session may be identified by a combination of a TEID and an IP address. The IP address may be the IP address of the sender of the message. It should be appreciated that also GTP-c messages include TEIDs. Although an initial session creation message, e.g. Create Session Request, may not have TEID, since the tunnel/session is still to be created, all subsequent GTP-c messages include the TEID in the GTP header.

In an embodiment, a range of TEID values and a range of IP addresses may be used to determine a user session in the software defined switch. TEID values may have a total range of 32 bits, whereby a portion of the TEID value range may be used to specify the originator. Size of the TEID value range portions may be determined depending for example on the processing capacity of the VMs allocated to process traffic in each portion. The range of IP addresses may be determined by a part of the IP address which defines a sub-network and thereby an address range for IP addresses of the hosts in the subnet. By determining the user session using ranges of TEID values and information of the sub-network, user sessions may be determined in group level for processing by VMs allocated to each group.

A TEID value range may be determined by the number of bits used for the TEID value. With 32 bits the total value range is 2^32 values', e.g. from 0 to 2^32−1. Portions of the total may be defined e.g. as equal size value ranges.

In 914, a gateway is determined for processing the session. The gateway may be a virtual gateway implemented by cloud computing resources as illustrated in FIG. 2. The cloud computing resources comprise VMs, where each active VM has a standby VM. The active VM and standby VM are allocated to a user session on the basis of rules. The rules may be determined by the SW CNTL and communicated to the software defined switch as described in FIGS. 4a and 4b.

It should be appreciated that the software defined switch may have information of a plurality of available gateways for processing incoming traffic. However, the determined session in 904 allows selecting the gateway and VMs allocated for the specific session.

After the gateway is determined traffic may be steered to for processing by the active VM 922 and the standby VM 924 of the gateway. Preferably the user plane traffic, e.g. GTP-u messages, are only forwarded to the active VM. The control plane traffic, e.g. GTP-c messages, is forwarded to both the active VM and the standby VM, similar to as illustrated in FIG. 3.

In an embodiment, rules for controlling a software defined switch may comprise a mapping of received traffic to a pair of VMs. The mapping may comprise criteria for the received traffic. When the criteria for the received traffic are met, the received traffic may be processed by the pair of VMs. In one example, the criteria may be defined by a portion of tunnel endpoint identifier value range and a definition of the sub-network that originated the received traffic. The sub-network may be defined by a portion of the IP address. Accordingly, it is possible that traffic belonging to a user session may be forwarded for processing by VMs allocated to a group of user sessions.

An embodiment provides a computer program embodied on a distribution medium, comprising program instructions which, when loaded into an electronic apparatus, cause the CPU to perform according to an embodiment of the present invention.

The computer program may be in source code form, object code form, or in some intermediate form, and it may be stored in some sort of carrier, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital computer or it may be distributed amongst a number of computers.

It should be appreciated that the various embodiments and examples described above may be combined to provide a functionality according to an embodiment. The functionality may be implemented by an apparatus according to an embodiment by various means described herein. In one example these means comprise program code for execution by an electronic apparatus, for example a computer.

The computer program may be in source code form, object code form, or in some intermediate form, and it may be stored in some sort of carrier, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital computer or processor or it may be distributed amongst a number of computers or processors.

The techniques described herein may be implemented by various means comprising means for implementing functionality of a corresponding apparatus described with an embodiment and it may comprise separate means for each separate function, or means may be configured to perform two or more functions. For example, these techniques may be implemented in hardware (one or more apparatuses), firmware (one or more apparatuses), software (one or more modules), or combinations thereof. For a firmware or software, implementation can be through modules (e.g., procedures, functions, and so on) that perform the functions described herein. The software codes may be stored in any suitable, processor/computer-readable data storage medium(s) or memory unit(s) or article(s) of manufacture and executed by one or more processors/computers. The data storage medium or the memory unit may be implemented within the processor/computer or external to the processor/computer, in which case it can be communicatively coupled to the processor/computer via various means as is known in the art.

It will be obvious to a person skilled in the art that, as the technology advances, the inventive concept can be implemented in various ways. The invention and its embodiments are not limited to the examples described above but may vary within the scope of the claims.

The invention claimed is:

1. A method comprising:
    allocating cloud computing resources to process a user session by a gateway in a mobile communications network;
    allocating the cloud computing resources in pairs to user sessions, wherein a cloud computing resource of the cloud computing resources comprises an instance of allocatable computing resources in a software defined switch under control of a switch controller, and wherein each pair for each user session comprises an active cloud computing resource for processing a received user and control plane traffic of the user session, and a standby cloud computing resource being a standby for the active cloud computing resource, the standby cloud computing resource being configured to also process the control plane traffic of the user session,
    wherein the received user plane traffic in the user session is forwarded for processing by the allocated cloud computing resources on the basis of information derived from the received user plane traffic, said information defining a portion of tunnel end point identifier value range and a sub network originating the received user plane traffic;
    determining a failure of one cloud computing resource from a pair of cloud computing resources allocated to the user session;
    allocating a new cloud computing resource to the pair;

sending, to the switch controller, information on the new allocation of at least one cloud computing resource allocated to the user session for processing user plane traffic of the user session;

updating, by the switch controller, a current allocation between a user session and a cloud computing resource allocated to the user session, on the basis of the obtained new allocation, and obtaining and updating, by the gateway, rules from the switch controller.

2. The method according to claim 1, further comprising: determining the failure of one cloud computing resource from the pair of cloud computing resources comprising the active cloud computing resource and the standby cloud computing resource allocated to the user session.

3. The method according to claim 2, further comprising: replacing the failed cloud computing resource by a new cloud computing resource, when the failed cloud computing resources comprise the standby cloud computing resource.

4. The method according to claim 2, comprising: setting the standby cloud computing resource as active, when the failed cloud computing resource comprises the active cloud computing resource; and allocating the new cloud computing resources as active to the pair.

5. The method according to claim 1, further comprising: allocating a first pair of cloud computing resources to the user session, wherein a first cloud computing resource in the first pair is active, and a second cloud computing resource in the first pair is a standby for the active cloud computing resource.

6. The method according to claim 1, further comprising: receiving the control plane traffic of the user session; and forwarding the control plane traffic to both cloud computing resources from a pair of cloud computing resources allocated to the user session.

7. The method according to claim 1, further comprising: receiving the user plane traffic of the user session; and processing the received user plane traffic by an active cloud computing resource from a pair of cloud computing resources allocated to the user session.

8. The method according to claim 1, further comprising: receiving tunneled traffic originating from a network addressable host;

deriving a tunnel end point identifier, TEID, and a network address of the originator from the received traffic;

determining a session associated with the received traffic on the basis of the derived information and forwarding the received traffic for processing by a pair of cloud computing resources allocated to the session.

9. The method according to claim 1, wherein the cloud computing resources are allocated to groups for user sessions.

10. The method according to claim 1, wherein information indicating allocated cloud computing resources are communicated from a controller of cloud computing resources to a controller of software defined switches by a control protocol.

11. A computer program product embodied in a non-transitory computer-readable medium, said product comprising executable code that when executed, cause execution of functions of a method according to claim 1.

12. A method comprising:
obtaining information on a pair of cloud computing resources allocated to a user session by a gateway in a mobile communications network, wherein a cloud computing resource comprises an instance of allocatable computing resources in a software defined switch under control of a switch controller, and wherein the pair of cloud computing resources comprises an active cloud computing resource for processing a received user plane traffic of the user session, and a standby cloud computing resource being a standby for the active cloud computing resource, wherein the received user plane traffic in the user session is forwarded for processing by the allocated cloud computing resources on the basis of information derived from the received user plane traffic, said information defining a portion of tunnel end point identifier value range and a sub network originating the received user plane traffic;

determining rules for the pair configured to enable forwarding of incoming control plane traffic associated with the user session to the both cloud computing resources forming the pair;

sending the rules to the software defined switch;

deploying, by the software defined switch, the rules wherein the user session is processed according to the rules, wherein rules are sent to the gateway;

obtaining, by the switch controller from the gateway, information on the new allocation of at least one cloud computing resource allocated to the user session for processing user plane traffic of the user session; and updating, by the switch controller, a current allocation between a user session and a cloud computing resource allocated to the user session, on the basis of the obtained new allocation.

13. A system comprising:
a switch controller; and
a gateway comprising at least one processor; and at least one memory including computer code, wherein the at least one memory and the computer code are configured to, with the at least one processor, cause the gateway at least to:

allocate cloud computing resources to process a user session by a gateway in a mobile communications network;

allocate the cloud computing resources in pairs to user sessions, wherein a cloud computing resource of the cloud computing resources comprises an instance of allocatable computing resources in a software defined switch under control of a centralized controller, and wherein each pair for each user session comprises an active cloud computing resource for processing a received user and control plane traffic of the user session, and a standby cloud computing resource being a standby for the active cloud computing resource, the standby cloud computing resource being configured to also process the control plane traffic of the user session, wherein the received user plane traffic in the user session is forwarded for processing by the allocated cloud computing resources on the basis of information derived from the received user plane traffic, said information defining a portion of tunnel end point identifier value range and a sub network originating the received user plane traffic;

determine a failure of one cloud computing resource from a pair of cloud computing resources allocated to the user session; allocate a new cloud computing resource to the pair;

send, to the switch controller, information on the new allocation of at least one cloud computing resource allocated to the user session for processing user plane traffic of the user session; and obtain and update rules from the switch controller, wherein the switch controller is configured to:
update a current allocation between a user session and a cloud computing resource allocated to the user session, on the basis of the obtained new allocation.

14. A gateway for a mobile communications network, said gateway comprising user plane traffic processors implemented by cloud computing resources allocated in pairs to user sessions, wherein a cloud computing resource of the cloud computing resources comprises an instance of allocatable computing resources in a software defined switch under control of a centralized controller, and wherein each pair for each user session comprises an active cloud computing resource for processing a received user and control plane traffic of the user session, and a standby cloud computing resource being a standby for the active cloud computing resource, the standby cloud computing resource being configured to also process the control plane traffic of the user session, and user plane traffic is processed by an active cloud computing resource for a session and control plane traffic is forwarded to both cloud computing resources of the pair of cloud computing resources associated with the session, wherein the received user plane traffic in the user session is forwarded for processing by the allocated cloud computing resources on the basis of information derived from the received user plane traffic, said information defining a portion of tunnel end point identifier value range and a sub network originating the received user plane traffic;

wherein the gateway is configured to determine a failure of one cloud computing resource from the pair of cloud computing resources; allocate a new cloud computing resource to the pair of cloud computing resources;

send, to the switch controller, information on the new allocation of at least one cloud computing resource allocated to the user session for processing user plane traffic of the user session; and obtain and update rules from the switch controller.

* * * * *